United States Patent [19]

Harvill

[11] 4,002,215
[45] Jan. 11, 1977

[54] PORTABLE WEIGH APPARATUS FOR MEASURING LIQUID VOLUME

[75] Inventor: William Andrew Harvill, Decatur, Ga.

[73] Assignee: The Coca-Cola Company, Atlanta, Ga.

[22] Filed: Feb. 26, 1976

[21] Appl. No.: 661,899

[52] U.S. Cl. .............................................. 177/146
[51] Int. Cl.² ........................................ G01G 7/02
[58] Field of Search .......... 177/130, 131, 146, 126; 222/55

[56] References Cited

UNITED STATES PATENTS

| | | | |
|---|---|---|---|
| 2,358,770 | 9/1944 | Carliss | 177/130 |
| 3,381,767 | 5/1968 | Rairigh | 177/126 |

Primary Examiner—Stanley H. Tollberg
Attorney, Agent, or Firm—W. Dexter Brooks

[57] ABSTRACT

An apparatus for measuring the volume of a liquid delivered in bulk to an outlet storage tank is described. A portable weigh apparatus is provided for transportation to each outlet by the delivery truck. The measuring apparatus includes a plurality of jacks for lifting the storage tank, load cells for sensing the load generated by the lifted storage tank, and a display unit for providing a direct readout of the volume of liquid dispensed into the storage tank. In one embodiment the measuring apparatus comprises a portable wheeled cart. In a second embodiment the measuring apparatus comprises a device of lightweight, foldable construction, which can be lifted and carried by hand from the delivery truck to a position below the storage tank.

12 Claims, 6 Drawing Figures

PORTABLE WEIGH APPARATUS FOR MEASURING LIQUID VOLUME

BACKGROUND OF INVENTION

1. Field of Invention

The present invention relates to a bulk delivery and dispensing system for liquids, such as syrup, utilized for making soft drinks. More specifically, the present invention relates to an apparatus for measuring the volume of a liquid dispensed into a storage tank at a customer outlet.

2. Description of Prior Art

Heretofore measurement of the volume of delivered bulk liquids has generally been effected by volumetric measuring devices either on the delivery truck or in the storage tank at a customer outlet. These volumetric devices quite often become inaccurate over extended periods of use and require replacement or repair. These inaccuracies arise because these devices cannot distinguish the volumetric errors that occur in the liquids as a result of thermal expansion, air entrainment and sugar inversions. In view of such errors, these volumetric devices do not measure the correct volume of liquid delivered to the storage tank at the customer outlet.

Another approach to measuring the volume of a liquid dispensed into a storage tank is by the direct weight approach, wherein the storage tanks at each customer outlet contain a scale means for measuring the weight of material dispensed into the storage tank and converting the weight to a volumetric readout. A system of this type is disclosed in U.S. Pat. No. 3,034,543 to DuBois issued in March of 1962. The DuBois system suffers, inter alia, from the disadvantage that each tank requires a costly scale, and in case of malfunction thereof, the storage tank is temporarily out of operation. Thus, the system at the customer outlet must be temporarily shut down for repairs.

Other approaches to measuring the volume of liquid dispensed into a storage tank by weighing the tank are illustrated in the U.S. Pat. Nos. to Alcott (2,330,857), Stone (3,785,412), and Hagans (2,746,258). Also, several approaches for lifting an object to be weighed by suitable jack means are illustrated by the U.S. Pat. Nos. to Witherell (344,762), McFarlane (932,050), Grime (2,373,469) and Miller (2,806,686). However, all of these approaches are highly inaccurate, unreliable, overly sophisticated and totally diverse from the portable weigh apparatus of the present invention.

SUMMARY OF THE INVENTION

Accordingly, it is a primary object of the present invention to provide a portable weigh apparatus which is transportable from outlet-to-outlet, for measuring the volume of a liquid delivered to customer outlets.

It is another object of the present invention to provide a portable weigh apparatus which provides a direct readout of the volume of liquid delivered to a customer outlet.

It is a further object of the present invention to provide a portable weigh apparatus having means for providing a digital readout of the volume of liquid delivered.

It is still a further object of the present invention to provide in one embodiment a portable wheeled cart, which functions as a hand truck for transporting a display unit to a storage tank, and as a weigh apparatus when placed beneath the storage tank.

It is yet another object of the present invention to provide a lightweight weigh apparatus which can be carried by hand from the delivery truck to a storage tank to be weighed.

The objects of the present invention are fulfilled by providing a portable weigh apparatus which includes jack means for lifting the storage tanks into which the delivered liquid is dispensed, load cells for measuring the load generated by the storage tank, and display means for providing a direct readout of the volume of liquid dispensed into the storage tank in response to a load signal generated by the load cells.

In a first embodiment the portable weigh apparatus of the present invention comprises a mobile wheeled cart. The wheeled cart functions as a hand cart, as it is rolled from the delivery truck to the storage tank, for transporting a digital display unit to the tank. The display unit is then removed and placed in a suitable location adjacent to the storage tank while the cart is rolled to a position beneath the storage tank to be filled with liquid. The display unit is connected to the load cells of the cart by a flexible cable and the tank is lifted by the jack means of the cart. After the dispensing of the liquid into the storage tank is complete, the volume of liquid dispensed into the storage tank is read by the operator from the display unit and recorded on a customer invoice.

In a second embodiment the portable weigh apparatus of the present invention comprises a lightweight, foldable construction, which can be carried by hand from the delivery truck by a handle similar to that of a suitcase or tool kit. When positioned under the storage tank to be weighed, the scale is unfolded to properly locate the jacks thereof. In this embodiment the display means is integral with the other components of the weigh apparatus. Once unfolded and set up under the storage tank, the measuring sequence performed by the weigh apparatus of this embodiment is similar to that of the mobile wheeled cart embodiment discussed hereinbefore.

BRIEF DESCRIPTION OF THE DRAWINGS

The objects of the present invention and the attendant advantages thereof can be more fully understood by reference to the following drawings wherein.

DETAILED DESCRIPTION OF PREFERRED EMBODIMENTS

Figure 1:
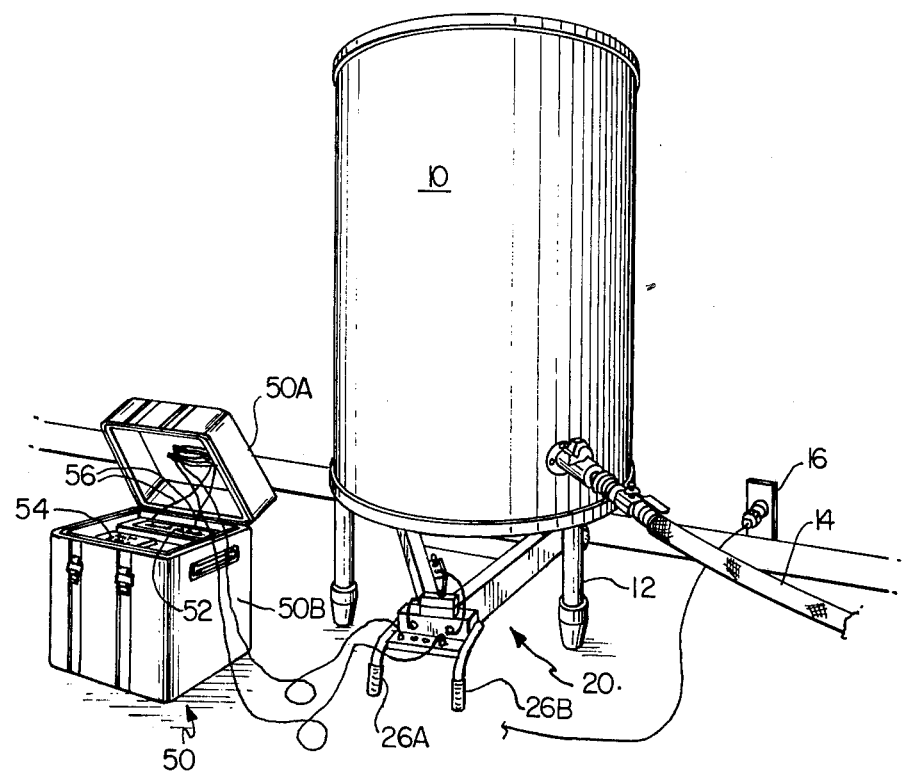
FIG. 1 is a perspective view illustrating the dispensing and measurement system of the present invention.

Referring in detail to FIG. 1, there is illustrated in perspective the component parts of the system of the present invention and their relative locations during a dispensing and measuring cycle. More specifically, there is illustrated a storage tank generally indicated 10 for receiving a liquid dispensed from a truck (not shown) through a filling hose 14. Storage tank 10 is provided with a plurality of support legs 12 which elevate the tank above the supporting surface to provide room for a mobile weigh apparatus or cart generally indicated 20. In the position shown, as will become more fully apparent hereinafter, the weigh apparatus or cart 20 has been actuated to lift the tank 10 to an elevated position by means of a plurality of jacks 28A, 28B and 28C.

A separate display unit 50 is located on the floor at a remote position from weigh cart 20 and includes a digital indicator scale 52, appropriately calibrated, and an automatic tape unit 54 to provide an automatic print out if desired. Display unit 50 includes a protective housing or case comprising a top 50A hinged to a bottom 50B. Flexible connectors such as electrical cables 56 are provided for coupling the display unit 50 to the power supply and load cells of mobile weigh cart 20.

As will become more fully apparent hereinafter, display unit 50 is initially supported on mobile weigh cart 20 and is transported from the delivery truck thereon to the site of the storage tank 10. However, before mobile weigh cart 20 is placed into position beneath storage tank 10, display unit 50 is removed therefrom and placed in the remote position shown.

The power source for mobile weigh cart 20 and display unit 50 may be a battery supported within mobile weigh cart 20 or if desired may be a wall outlet 16 adjacent storage tank 10 at the customer outlet.

Figure 2:
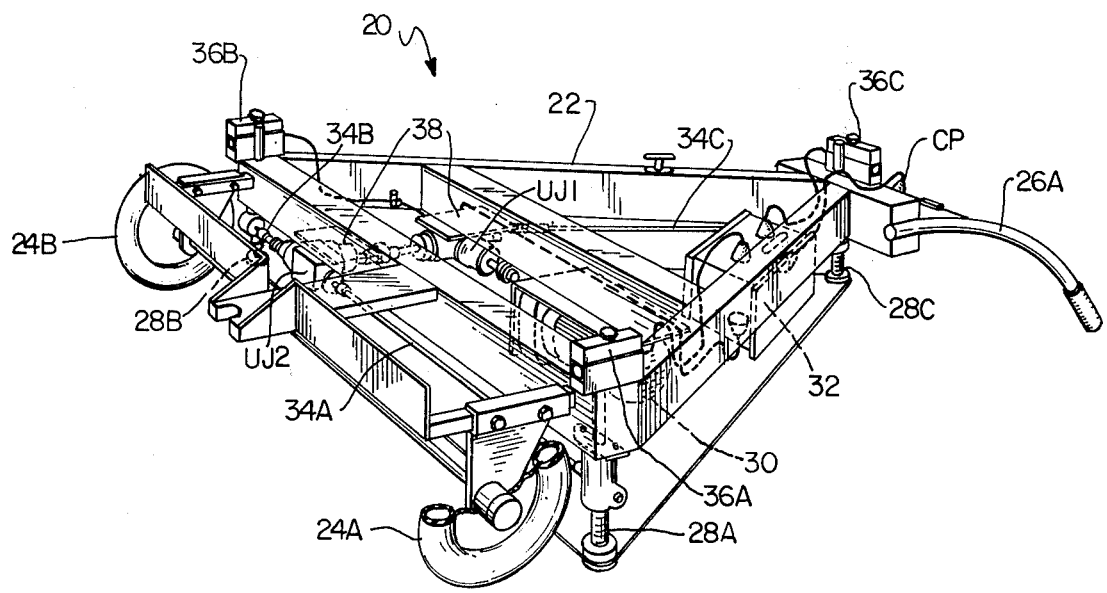
FIG. 2 is a perspective view of a first embodiment of a portable weigh apparatus of the present invention in the form of a mobile wheeled cart.

Referring to FIG. 2 there is illustrated the details of the mobile weigh cart illustrated in the system of FIG. 1. Weigh cart 20 comprises a generally triangular frame 22 having a pair of wheels 24A, 24B rotatably connected to the fore end thereof. At the aft end of frame 22 there is provided a pair of handles 26A which enable a delivery man at a customer outlet to lift the aft end of frame 22 and roll the cart on wheels 24A, 24B. At the respective corners of the triangular frame 22 there are provided a plurality of jacks 28A, 28B and 28C which are suitably connected to the bottom of frame 22. Each of the jacks 28A, 28B and 28C are provided with downwardly extensible legs which rest on the supporting surface and raise the entire cart 20 when suitable power means is applied thereto. In a preferred embodiment, jacks 28 are of the screw type which are driven by an electric motor 30 coupled to the respective jacks through universal joints UJ1, UJ2 and drive shafts 34A, 34B and 34C. As stated hereinbefore, the power for electric motor 30 may be derived from a DC battery mounted within the frame 22 or from a suitable external source such as a conventional wall outlet.

On top of frame 22 in alignment with jack 28 are a plurality of load cells 36A, 36B and 36C. Load cells 36 may be any suitable type of electrical transducers known in the art, which convert a force (or load) measurement to an electrical signal proportional to the load thereon. In the alternative, load cells 36 may be compressible hydraulic sensors in conjunction with presure transducers, which convert the compressional force thereon into a hydraulic pressure signal which in turn is proportional to the force of said load. Load cells 36 as described hereinbefore are suitably coupled through flexible electrical cables to display unit 50 disposed at a remote location. The electrical signals generated through these cables are converted to volumetric units based on the density (at fixed conditions) of the liquid to be measured. These volumetric units are subsequently displayed on display unit 50. Needless to say, the display unit 50 is calibrated for the density of the liquid to be measured. The readout of the display unit 50 may constitute any conventional digital indicator.

Also supported on the top of frame 22 of mobile weigh cart 20 are a pair of support pads 38. These support pads 38 are provided to support display unit 50 on weigh cart 20 when cart 20 is rolled by the delivery man from the truck to storage tank 10. Thus, mobile weigh cart 20 also functions as a hand truck to move display unit 50 from the delivery truck to the dispensing and measuring site.

Figure 3:
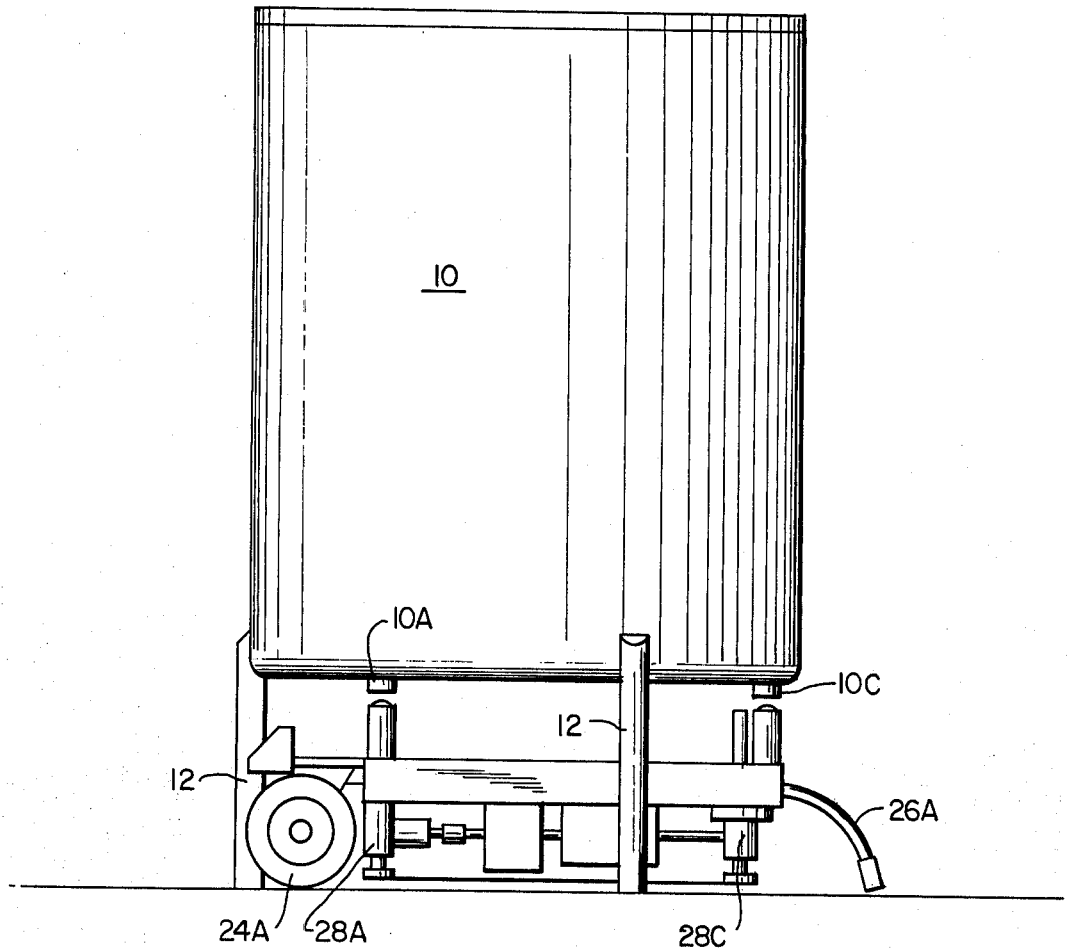
FIG. 3 is a side elevational view illustrating the operation of the mobile wheeled cart of FIG. 2.

The operation of the mobile weigh cart 20 of FIG. 2 can best be illustrated by reference to FIGS. 1 and 3. As illustrated therein, mobile weigh cart 20 is initially rolled beneath storage tank 10 between legs 12. Storage tank 10 is provided on its underside with a plurality of load pads 10A, 10B (not shown), 10C. These load pads, when cart 20 is in the proper position, are in alignment with load cells 36A, 36B and 36C, respectively. Once in position beneath tank 10 the downwardly extensible legs of jacks 28A, 28B, 28C are lowered to the floor to support weigh cart 20 in a substantially horizontal position. Movement of these legs is effected by depressing an ON-OFF switch on control panel 36 of weigh cart 20 thereby energizing lift motor 30 driving the legs of jacks 28 downwardly. As the legs continue downwardly the entire cart 20 is lifted in a substantially vertical direction whereby load cells 36 contact load pads 10 on tank 10. As jacks 28A continue to lift cart 20 upwardly, storage tank 10 is lifted until its entire weight rests upon load cells 36.

In this position with storage tank 10 empty, display unit 50 can be observed to zero its reading or be properly calibrated to facilitate a subsequent accurate measurement of the quantity of liquid dispensed. The filling operation of storage tank 10 then begins by connecting filling hose 14 thereto and filling tank 10 to a desired level with the viscous liquid being delivered. The filling hose 14 is then disconnected and a direct readout of the volume of liquid dispensed into tank 10 is available on display unit 50. This readout is available on display 52 as a digital display of gallons, or in the alternative, can be a digital printout effected by automatic tape unit 54.

When a readout is obtained and recorded jacks 28 are energized in a reverse direction, thus lowering storage tank 10 to the floor until it rests on support legs 12. As jacks 28 continue to be energized in this direction, the legs thereof will be retracted upwardly until they are out of contact with the floor. Then the cart 20 may be removed from underneath the tank display unit 50 loaded thereon, and the entire mobile weigh cart 20 wheeled back to the delivery truck.

Figure 4:
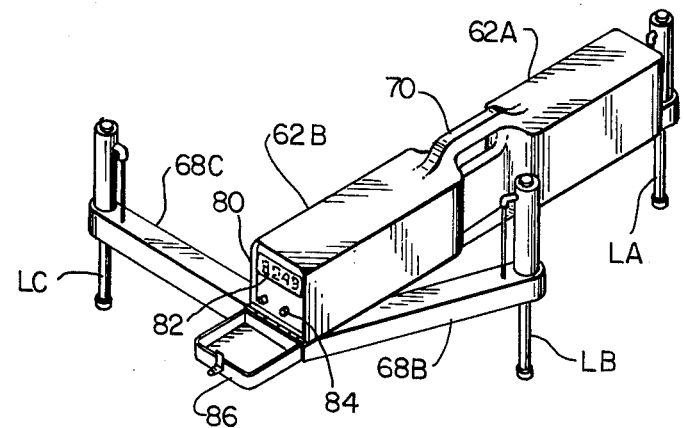
FIG. 4 is a perspective view of a second embodiment of a portable weigh apparatus of the present invention which is suitable for measuring the material dispensed into a storage tank.
Figure 5:
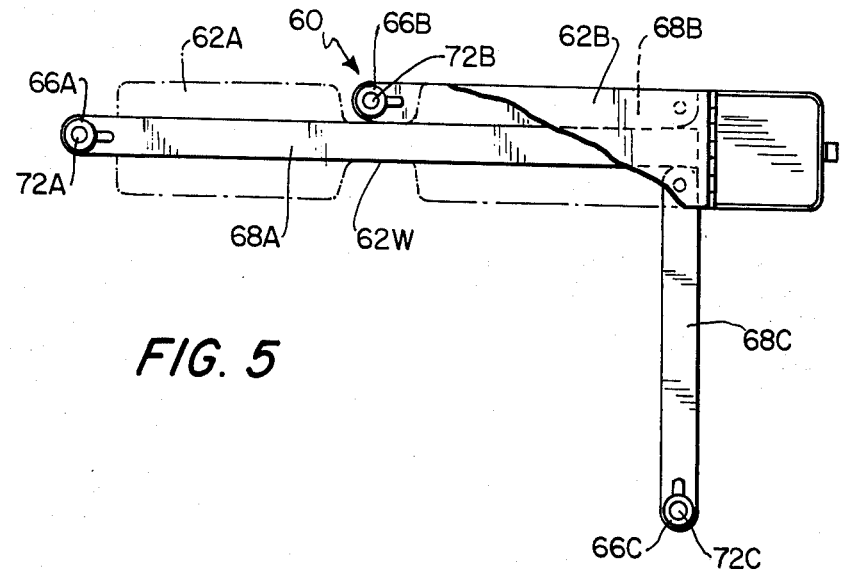
FIG. 5 is a top plan view of the portable weigh apparatus of FIG. 4.
Figure 6:
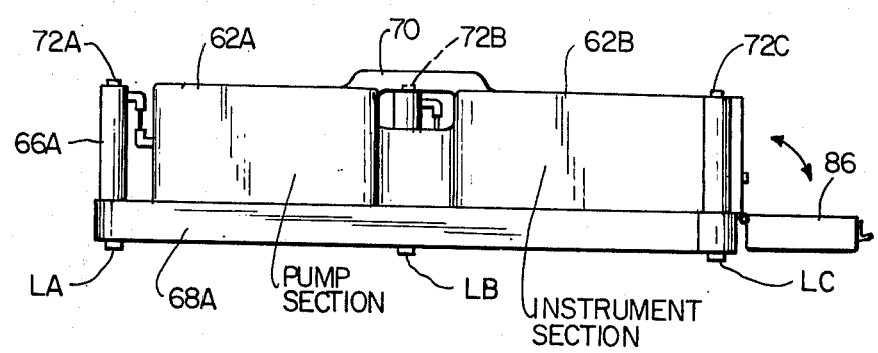
FIG. 6 is a side elevational view of the portable weigh apparatus of FIG. 4.

A second embodiment of the portable weigh apparatus suitable for use in a dispensing system of the present invention is illustrated in detail in FIGS. 4 to 6. The portable weigh apparatus of this embodiment 60 includes an elongated housing 62 having a first compartment or pump section 62A and a second compartment or instrument section 62B. Sections 62A and 62B are connected by a waist portion 62W which defines a recess for receiving some of the jacks of weigh apparatus 60 therein in a manner to be described hereinafter. Housing 62 may be fabricated from fiberglass, plastic or any other suitable lightweight material.

A stationary support arm 68A extends longitudinally beneath the housing 62, is rigidly affixed to the bottom thereof and supports housing 62A and 62B. One end of arm 68A extends slightly beyond the end of section 62A and has a suitable hydraulic jack 66A affixed thereto. Jack 66A is provided with an extensible leg LA at the bottom thereof and is provided on the top surface thereof with a load cell 72A, which converts vertical load forces to a pressure proportional to the load and eliminates undesirable side loads through the use of conventional load buttons.

A pair of pivotable arms 68B and 68C are hinged to the opposite end of housing 62 and are rotatable between an inboard position and an outboard position. Each of these pivotable arms 68 are provided with jacks at their distal ends which are of a similar nature to jack 66A. That is, each has a downwardly extensible leg LB, LC and each has a load cell 72B, 72C disposed on the top thereof. As can be seen from viewing FIGS. 4 to 6, the portable weigh apparatus of this embodiment of the invention can be folded up into a very compact unit and unfolded at the time of weighing or measuring the liquid dispensed into a storage tank such as 10 of FIG. 1. In other words, during a storage or transportation mode of operation of the weigh apparatus 60, jacks 66B and 66C with arms 68B and 68C in their inboard positions, are recessed within waist portion 62W of housing 62. Whereas during weighing or measuring of storage tank 10, arms 68B and 68C are rotated outwardly until they are substantially perpendicular to housing 62. In this position jacks 66A, 66B and 66C are energized in a similar manner to the jacks 28 of weigh apparatus 20 to lift storage tank 10 and measure the volume of the liquid dispensed into the same.

In the embodiment illustrated in FIGS. 4 to 6, it is contemplated that jacks 66 are to be hydraulic. In this instance, it is necessary to provide a reservoir of hydraulic fluid and three pumps to drive the same in order to energize the hydraulic cylinders of the jacks in a manner well known in the art. The hydraulic fluid and pumps may be wholly contained within section 62A of housing 62. Suitable cable means (not shown) may be provided to supply power to the pump from an external pneumatic, electrical or similar power supply (not shown).

A display unit 80 for the portable weigh apparatus 60 may be located in the instrument section of the housing, namely, 62B. As illustrated in FIG. 4, a window is provided in an end wall of section 62B to facilitate a viewing of a digital scale 82 on display unit 80.

As in the display unit 50 described hereinbefore, the digital display 82 of display unit 80 may be calibrated to provide a direct digital readout of volume dispensed. The portable weigh apparatus 60 may be turned on or off to raise storage tank 10 by means of push button switches 84 disposed in the display section. There is further provided a hinged display cover 86 which is opened or closed depending on whether or not the weigh apparatus is in use.

A handle 70 is provided on the top of housing 62 adjacent the waist portion 62W. Accordingly, by grasping handle 70 and folding rotatable arms 68B and 68C inwardly, the scale 60 may be carried from the truck to the storage tank in a similar manner to a conventional tool kit. Thus, the structure of the scale unit 60 provides a lightweight compact and extremely portable unit, which may be transported with ease between a delivery truck and the storage tanks to be filled.

The load cells 72A, 72B and 72C of FIGS. 4 to 6 are hydraulic sensors as described hereinbefore, or may be electronic transducers, if so desired. In either case, the output signals of load cells 72 must be coupled to the input of display unit 80 where the outputs are converted to a direct readout of volume dispensed.

The operation of the weigh apparatus 60 of FIGS. 4 to 6, once in position beneath storage tank 10, is substantially the same as that of weigh cart 20. That is, it lifts tank 10 until it is supported by load cells 72A, 72B, 72C and then measures the weight of fluid dispensed into the storage tank 10.

It should be understood that the embodiments of the present invention may be modified as would occur to one of ordinary skill in the art without departing from the spirit of scope of the present invention.

I claim:

1. In a system for measuring the volume of material dispensed into a container, a mobile weigh cart comprising:
   frame means, said frame means having a top surface, a bottom surface and fore and aft ends;
   wheel means rotatably secured to said fore end of said frame means;
   handle means secured to the aft end of said frame means for lifting said frame means to facilitate the transportation of said frame means on said wheel means;
   jack means extending from the bottom surface of said frame means for lifting said frame means and said container;
   load cell means disposed on the top of said frame means for supporting said container, sensing the load generated thereby, and generating a signal proportional to said load;
   display unit means for directly indicating the volume based upon the density of said material in said container in response to said signal generated by said load cell means;
   support means on he top of said frame means for removably supporting said display unit means;
   motive power means supported by said frame means for generating a lifting force to drive said jack means; and
   control means for energizing said motive power means.

2. The weigh cart of claim 1 herein there is further provided extendable signal transmission means coupling said display unit means to said load cell means to facilitate operation of said display unit means at a position remote from said frame means.

3. The weigh cart of claim 1 wherein said motive power comprises an electric lift motor coupled to said jack means by drive shaft means.

4. The weigh cart of claim 1 wherein said frame means is substantially triangular in shape.

5. The weigh cart of claim 1 wherein said display unit means includes means for digitally displaying the volume based upon the density of said material in said container.

6. A portable weigh apparatus including jack means for lifting an afticle to be weighed comprising:
   an elongated housing means;
   a jack rigidly secured to said housing;
   a pair of pivotable support arms hinged to said housing for movement between a first position inboard of said housing and a second position outboard of said housing;
   a jack secured to each of said pivotable support arms;

load cell means disposed on the top of each of said jacks for supporting the article to be weighed, sensing the load generated thereby, and generating a signal proportional to said load;

display unit means disposed within said housing for displaying through a window in said housing the magnitude of said signal proportional to said load; and motive power means disposed in said housing for generating a lift force to drive said jack means.

7. The weigh apparatus of claim 6 wherein there is further provided a hinged cover plate for covering said window in said housing when said display unit is not in use.

8. The weigh apparatus of claim 6 wherein said housing includes first and second compartments joined by a waist portion, one of said compartments containing said display unit and the other of said compartments containing said motive power means.

9. The weigh apparatus of claim 8 wherein the jacks on said pair of pivotable support arms are recessed within said waist portion of said housing means, when said support arms are disposed in said first position inboard of said housing.

10. The weigh apparatus of claim 8 wherein there is further provided handle means coupled to said housing adjacent the waist portion thereof.

11. The weigh apparatus of claim 6 wherein said article being weighed is a container containing a material of an unknown volume and said display unit means is calibrated to give a direct readout of said unknown volume.

12. The weigh apparatus of claim 11 wherein said display unit provides a digital display of said volume.

* * * * *